(12) United States Patent
Gschwind et al.

(10) Patent No.: US 10,095,524 B2
(45) Date of Patent: Oct. 9, 2018

(54) METHOD AND APPARATUS FOR DYNAMICALLY REPLACING LEGACY INSTRUCTIONS WITH A SINGLE EXECUTABLE INSTRUCTION UTILIZING A WIDE DATAPATH

(71) Applicant: INTERNATIONAL BUSINESS MACHINES CORPORATION, Armonk, NY (US)

(72) Inventors: Michael Gschwind, Chappaqua, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 14/546,616

(22) Filed: Nov. 18, 2014

(65) Prior Publication Data

US 2015/0082009 A1 Mar. 19, 2015

Related U.S. Application Data

(63) Continuation of application No. 11/416,421, filed on May 2, 2006, now Pat. No. 8,904,151.

(51) Int. Cl.
*G06F 9/30* (2018.01)
*G06F 9/38* (2018.01)

(52) U.S. Cl.
CPC .......... *G06F 9/3853* (2013.01); *G06F 9/3013* (2013.01); *G06F 9/30014* (2013.01); *G06F 9/3017* (2013.01); *G06F 9/30036* (2013.01); *G06F 9/30043* (2013.01); *G06F 9/30112* (2013.01); *G06F 9/30149* (2013.01); *G06F 9/30196* (2013.01); *G06F 9/382* (2013.01); *G06F 9/384* (2013.01); *G06F 9/3861* (2013.01)

(58) Field of Classification Search
CPC ........ G06F 9/30; G06F 9/30145; G06F 9/382; G06F 9/3853; G06F 9/3887
USPC ............................... 712/22, 23, 24, 213, 220
See application file for complete search history.

(56) References Cited

U.S. PATENT DOCUMENTS

| | | | |
|---|---|---|---|
| 5,860,107 A * | 1/1999 | Patel | 711/140 |
| 6,839,828 B2 | 1/2005 | Gschwind et al. | |
| 2005/0160097 A1 | 7/2005 | Gschwind et al. | |
| 2005/0289529 A1* | 12/2005 | Almog et al. | 717/158 |

OTHER PUBLICATIONS

Gschwind et al., "Synergistic Processing in Cell's Multicore Architecture", IEEE Computer Society; 2006; pp. 2-16.
J.M. Tendler et al., "Power4 system microarchitecture", IBM Journal of Research and Development, vol. 46, No. 1 ; Jan. 2002; pp. 5-26.

(Continued)

*Primary Examiner* — David J. Huisman
(74) *Attorney, Agent, or Firm* — Tutunjian & Bitetto, P.C.; Jennifer Davis

(57) ABSTRACT

A processing system and method includes a predecoder configured to identify instructions that are combinable to form a single, executable internal instruction. Instruction storage is configured to merge instructions that are combinable. An instruction execution unit is configured to execute the single, executable internal instruction on a hardware wide datapath.

19 Claims, 6 Drawing Sheets

(56) References Cited

OTHER PUBLICATIONS

S. Gochman et al., "TheIntel Pentium M Processor: Microarchitecture and Performance", Intel Technology Journal, vol. 7, Issue 2, May 2003; pp. 21-36.
A. Pajuelo et al., "Speculative Dynamic Vectorization", Proceedings of the 29th Annual International Symposium on Computer Architecture; Anchorage, Alaska, 2002; pp. 1-10.
M. Moudgill et al., "Register Renaming and Dynamic Speculation: an Alternative Approach", Proceedings of the 26th Annual International Symposium on Microarchitecture, Sep. 1993; pp. 202-213.

\* cited by examiner

METHOD AND APPARATUS FOR DYNAMICALLY REPLACING LEGACY INSTRUCTIONS WITH A SINGLE EXECUTABLE INSTRUCTION UTILIZING A WIDE DATAPATH

RELATED APPLICATION INFORMATION

This application is a Continuation application of issued U.S. Pat. No. 8,904,151 filed on May 2, 2006, incorporated herein by reference in its entirety.

BACKGROUND

Technical Field

The present invention generally relates to processing of instructions in a microprocessor, and more particularly, to a method and apparatus for the dynamic creation of operations utilizing a wide datapath in a microprocessor.

Description of the Related Art

Modern microprocessor design faces a number of severe constraints, including non-scaling or reverse scaling of signal speeds in signal wires, the exploding power budgets associated with leakage energy, and burgeoning control complexity. The number of instructions simultaneously processed by a microprocessor is an important aspect for its architectural performance, but also for its complexity, possible operating frequency and energy consumption.

Specifically, as more instructions are being processed, storage structures must be allocated to store these instructions, resulting in increased area and thereby impacting both the leakage power and the length of signaling wires needed to transmit information. Additionally, supporting more instructions in flight entails more issue slots, more dependence checking logic, wider commit logic, and so forth. All of these increase both control complexity, and chip area to provide the needed controls.

To address these challenges, one promising solution is the use of architectures operating on wide data, wherein a single instruction word can execute on several data words simultaneously and in parallel. An example of a recent architecture exploiting pervasive data parallelism is described by U.S. Pat. No. 6,839,828; and U.S. Patent Application No. 2005/0160097 (SIMD-RISC MICROPROCESSOR). SIMD is single instruction multiple data processing wherein a single instruction operates on multiple data words.

While the introduction of a new architecture permits benefits from new pervasively data parallel instructions and operates on multiple data elements in parallel, the architecture prevents binary compatibility with previously deployed systems. An alternative is to add additional data-parallel computing elements to a microprocessor. New processor implementations can benefit from the provisioning of instructions operating on wide data, while permitting execution on legacy binaries using the base scalar instruction set.

Using the extended instruction set offers the advantage of increasing the number of operations which can be performed without increasing data structures to support an increase of the number of instructions which can be initiated and completed in a cycle, and storage structures such as instruction buffers, issue queues and commit tables used to track instructions.

While the introduction of instruction set extensions permits the adoption of advanced novel computing techniques such as data-parallel processing, adoption of such new techniques is often practically limited by the need to provide backward compatibility, wherein software developers need to ensure compatibility of an application not only with the most recent version of the architecture, but also with that of previous architecture generations.

In prior art, merging of instructions has been performed to reduce the number of memory requests, and to reduce tracking overhead by storing multiple instructions as part of a single instruction group, wherein some tracking information is only maintained on a per-group basis.

Referring now to the merging of instructions in the prior art, one form of merging includes merging multiple store requests using merging store queues. These are based on address values which are not available until after the fetch, dispatch, issuance and execution of an instruction, negating advantages provided by the present disclosure as will be discussed below. Merging store requests also does not improve computational performance of computationally bound problems and does not permit the exploitation of data-parallel execution data paths.

In accordance with the prior art, cache miss services can be combined. Again, this combining is based on address values computed by separate instructions, and by using a single wide line to satisfy multiple memory access requests, not by executing multiple operations in parallel.

The IBM POWER 4™ processor merges multiple Power Architecture™ instructions into an instruction group for efficient tracking in tables such as a GCT. (See Joel M. Tendler, J. S. Dodson, J. S. Fields, Jr., H. Le, B. Sinharoy, "*POWER4 System Microarchitecture,*" *IBM Journal of Research and Development,* Vol. 46, No. 1, pp. 5-26, January 2002). Instructions are independently issued and executed, needing separate space in issue queues and so forth.

A technique similar to POWER4™ group formation is used under the name micro-ops fusion to fuse micro-ops into macro-ops for tracking, as described in "The Intel Pentium M Processor: Microarchitecture and Performance", Intel Technology Journal, Volume 07, Issue 02, May 2003. Specifically, with micro-ops fusion, the Instruction Decoder fuses two micro-ops into one micro-op and keeps them united throughout most parts of the out-of-order core of the processor-at allocation, dispatch, and retirement. To maintain their non-fused behavior benefits, the micro-ops are executed as non-fused operations at the execution level. This provides an effectively wider instruction decoder, allocation, and retirement. Similar to the prior art POWER4™ microarchitecture, ops are fused for the purpose of tracking (including renaming, dispatch and retirement), but not fused for the purpose of execution. This is clearly depicted in the Intel Technology Journal article above where it is clearly shown that execution units work in the un-fused domain.

Pajuelo, Gonzalez, and Valero describe speculative dynamic vectorization in "Speculative Dynamic Vectorization", Proceedings of the 29th Annual International Symposium on Computer architecture, Anchorage, Ak., 2002. This technique depends on the detection of strided loop behavior, negating the performance benefits of short SIMD sequences, and requiring the provision of a full vector unit, a vector register file, and a validation engine for speculatively vectorized vector operation. This technique also does not target the creation of instructions operating on wide data (such as including, but not limited to, SIMD parallel execution), but traditional vector operations with its inherent strided access.

Because speculative dynamic vectorization is driven off strided loads, it is located in the back-end of a microprocessor pipeline, and does not reduce the number of operations which must go through the front end of the machine for fetching and validation. Thus, while this offers significant performance improvements for strided vector operations, it does not address the front end bottleneck in a satisfactory manner.

SUMMARY

Embodiments of the present invention provide methods and apparatus that permit modern microprocessors to execute instructions operating on wide data, while maintaining compatibility with legacy systems installed in the field. A code generation method is provided to generate instruction sequences conducive to execute with enhanced performance on modern microprocessors, while executing compatibly on prior art systems. Advantageously, the present embodiments merge instructions for execution.

What has eluded those skilled in the art so far is the ability to dynamically merge instructions for the purpose of generating internal instructions executing on wide data in wide datapaths to reduce the overhead of issuing and executing a plurality of instructions (each of the plurality of instructions being a single architected data word).

In accordance with present principles, instructions are dynamically combined to form a single instruction operating on a wide set of data in a wide datapath, thereby reducing the number of instructions that need to be tracked in a microprocessor, while permitting the instructions referring to architectural data widths to be present in an instruction stream. By preserving the presence of legacy instructions referring to architectural data width, compatibility with prior generation microprocessors, is preserved, hence permitting programs to execute on such prior generation microprocessors, while obtaining speedups on new microprocessors equipped with the ability to dynamically use internal instructions referring to wide data.

An exemplary processing system and method includes a predecoder configured to identify instructions that are combinable. Instruction storage is configured to merge instructions that are combinable by replacing the combinable instructions with a wide data internal instruction for execution. An instruction execution unit is configured to execute the internal instruction on a wide datapath.

A processing system includes a predecoder configured to identify instructions that are combinable to form a single, executable internal instruction, and an instruction storage configured to merge instructions that are combinable. An instruction execution unit is configured to execute the single, executable internal instruction on a hardware wide datapath.

Another processing system for merging instructions for execution on a wide datapath includes a predecoder configured to identify candidate architected instructions for merging from memory storage and a processor. The processor includes an instruction decoder configured to replace sets of acceptable architected candidate instructions with a single, executable internal instruction, and at least one execution unit configured to execute the single, executable internal instruction on a hardware wide datapath.

A method for merging instructions for execution on a wide datapath includes identifying candidate architected instructions for merging, replacing sets of acceptable architected candidate instructions with a single, executable wide path internal instruction, and issuing the single, executable internal instruction to a hardware wide datapath execution unit for execution.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
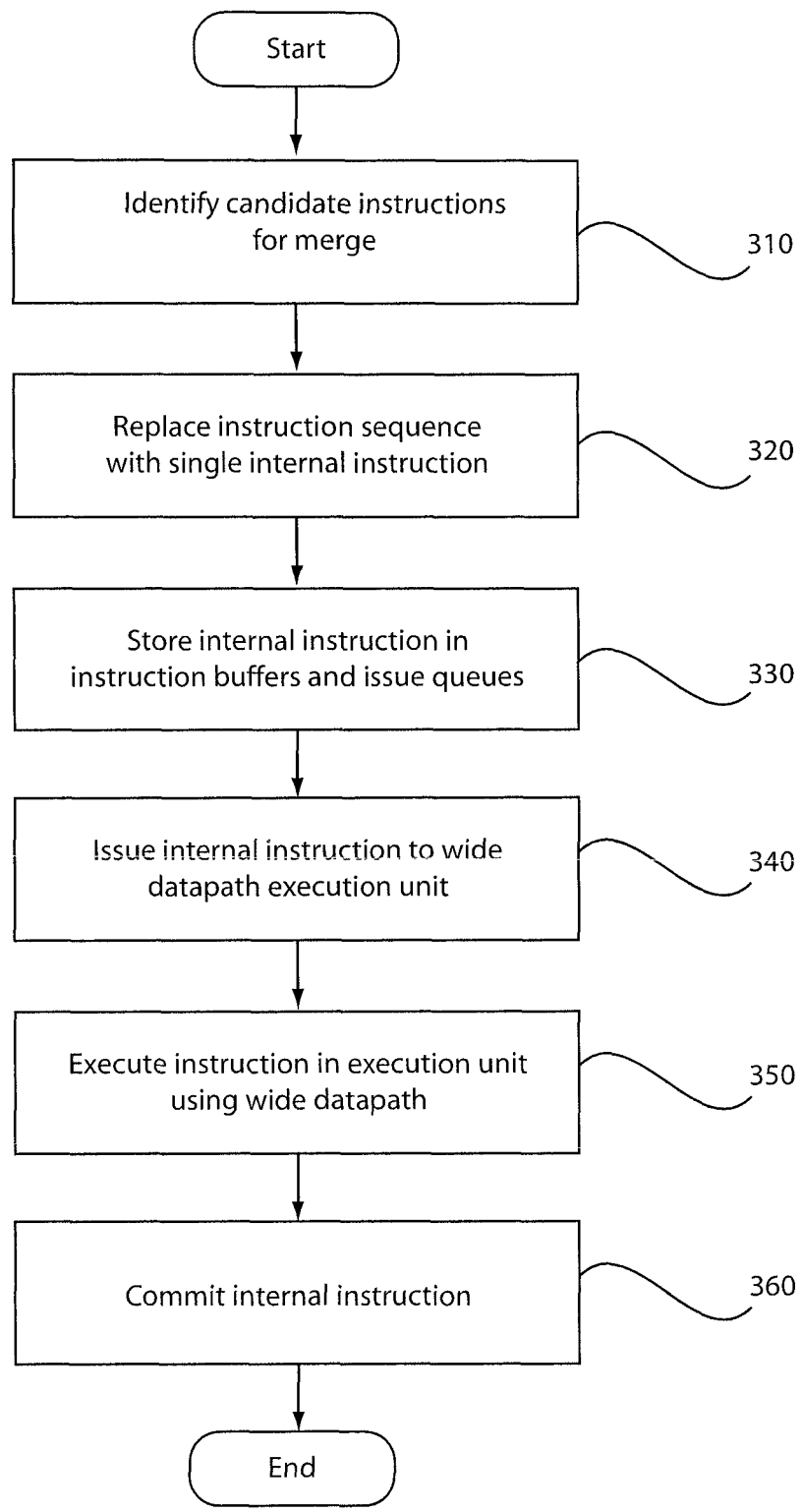
FIG. 1 is a block/flow diagram showing a process for merging instructions in accordance with one illustrative embodiment.

Embodiments disclosed herein provide methods and apparatuses which permit modern microprocessors to execute instructions operating on wide data, while maintaining compatibility with legacy systems installed in the field. A code generation method is provided to generate instruction sequences conducive to execute with enhanced performance on modern microprocessors, while executing compatibly on prior art systems.

In accordance with particularly useful embodiments, wide data refers to data having a size longer than an architectural width of data. The architectural width is the size of data that the system architecture was designed for. A wide datapath is a datapath that accommodates wide data. In accordance with aspects of the present invention, the wide datapath can accommodate wide and architectural data. A plurality of architectural instructions operating on architectural width data may be detected to be candidates for merging into an internal instruction operating on wide data using a wide datapath (wherein the wide datapath is wider than an architectural word), such as, for example, long words or SIMD parallel vector data. A test may be performed as to whether the candidates can be merged, and if the test is successful, wide internal operations are generated.

A microprocessor may include at least one datapath to operate on wide internal instructions. A compiler understands the formation of internal instructions operating on wide data, and operates on an internal representation using wide data formats. Before code generation, the compiler transforms its wide data representation into a sequence of legacy instructions encoded and presented in a manner conducive for hardware to identify as candidates and successfully merge instructions.

Embodiments of the present invention can take the form of an entirely hardware embodiment, an entirely software embodiment or an embodiment including both hardware and software elements. In a preferred embodiment, the present invention is implemented in hardware, but may include software elements, which include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments may take the form of an integrated circuit chip. The chip design is preferably created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Embodiments will now be illustratively described to combine instructions dynamically to form a single instruction operating on a wide set of data in a wide datapath, thereby reducing the number of instructions that need to be tracked in a microprocessor, while allowing the instructions referring to architectural data widths to be present in the instruction stream. By preserving the presence of legacy instructions referring to architectural data width, compatibility with prior generation microprocessors, is preserved, hence allowing programs to execute on such prior generation microprocessors, while obtaining speedups on new microprocessors equipped with the ability to dynamically internal instructions referring to wide data.

In one aspect of the present invention, a sequence of instructions used to implement long integer arithmetic or other wide data operations are recognized and replaced by a single instruction operating on a wide datapath. In another aspect of the present invention, instructions are merged to address performance needs of high-performance computing (HPC) numeric applications, by providing desirable support for data parallel short parallel vector SIMD computing. Data parallel SIMD execution simplifies execution of multiple operations in parallel by reducing the complexity, area and power dissipation associated per executed operation by amortizing the cost for processing an instruction in dispatch slots, issue queues, issue slots, commit buffers, and so forth.

In addition, embodiments permit the generation of instruction streams backward compatible with prior generation systems by inserting explicit legacy scalar instruction sequences into the instruction stream. A plurality of compliant implementations is possible to provide a low-end to high-end product differentiation, and permit an architecture to face multiple competing demands. Such demands may include some of the following.

Goal (1): Market economics need instruction set compatibility to offer a large compatible hardware base upon which to deploy compatible software to provide a large enough market to justify independent software vendor (ISV) investment. Goal (2): Markets also need product differentiation into more expensive high end systems, and more economic, less resource intensive products. These have to be served by a largely compatible instruction set base to meet the market size requirements for software development investment. Goal (3): ultra high end performance needs architecture innovation, mainly by exploiting data level parallelism, to achieve ever higher performance for the high-performance computing (HPC) market, yet avoid a fragmentation of the software base.

To meet goal (1), broadly speaking, instruction set innovation has to be extremely constrained, so as not to provide any fragmentation. Even if new architecture extensions are introduced, developer support and exploitation is likely to be low because of the smaller target market size of the machines supporting the new extensions. To meet goal (3), constant innovation is needed to keep processors at the leading edge of performance. Yet, such innovation is challenged by the need to run even many high-performance system codes across a range of platforms, to permit code development and debugging of HPC code on a low cost platform, while production use is on a high end platform.

Product differentiation demands to offer platform price/performance points along a wide range of spectrum, needing architectural restraint and avoiding the specification of architecture features that prohibit the implementation of cost-conscious designs. One way to achieve this is to demand that new additions, such as data parallel high-end computing instructions, e.g., using the parallel vector SIMD paradigm as implemented in the VMX and SPU instruction sets, to be present in all machines compliant with the architecture after the release of an architecture extension. This has a number of disadvantages, e.g., initially, software development platforms will be legacy systems, complicating software development efforts to exploit architecture extensions. In addition, data parallel implementations need additional logic and state, creating additional expense for hardware implementation, design and verification, and thus raising the minimum cost of a compliant low-end system.

Embodiments of the present invention include a method to provide architecture and microarchitectural ways to implement and exploit wide data-parallel datapaths, and execute instructions capable of exploiting such data paths when available. At the same time, it is desirable to provide the ability to run the same binary executables unmodified on legacy machines and low-end implementations without the provision of an expensive high-end data-parallel datapath.

Referring now to the drawings in which like numerals represent the same or similar elements and initially to FIG. 1, a block/flow diagram of one illustrative embodiment of the present invention is depicted as method steps. These method steps are preferably executed by one or more processors in a system. The method starts with step 310. In step 310, instructions are identified as candidates for being merged into an internal instruction operating on wide data to be executed on a wide datapath.

In step 320, a sequence of instructions which has been identified as candidate instructions for merging, and which satisfy conditions for merging, are replaced with a single internal instruction operating on wide data to be executed on a wide datapath. In step 330, at least one internal instruction created by step 320 is stored in at least one of a buffer, an issue queue, and a global completion table.

In step 340, at least one internal instruction having been created by step 320 to replace a sequence of architectural instructions is issued to an execution unit implementing a wide datapath. In step 350, the at least one internal instruction is executed in the execution unit using the wide datapath, In Step 360, the result generated by the execution of the at least one internal instruction is committed to a processor state.

Referring to step 310 in greater detail, in accordance with a preferred embodiment, the processor includes logic to recognize a sequence of at least two similar operations and merges them to be performed as one data parallel operation. In one exemplary embodiment, a pair of two like instructions referring to adjacent registers is identified as being a candidate to generate an internal instruction operating on wide data. In accordance with the embodiment, this logic is used to dynamically create SIMD-like internal dataflows. In the SIMD-oriented embodiment, control logic identifies two floating point operations wherein source and target operands refer to adjacent registers in a pairwise manner, e.g., when a register specifier of a first instruction refers to a register number n, the corresponding register specifier of the second instruction refers to register n+1.

In accordance with one exemplary instruction merging, two floating-point multiply-add instructions (FMA) are replaced with a single paired floating-point multiply add (PFMA) instruction:

Example 1

Code Sequence Using Architected Instructions
FMA f4=f8, f12, f16
FMA f5=f9, f13, f17
Internal Instruction Replacing Architected Sequence
PFMA f4=f8, f12, f16

In this example, the PFMA is a single internal operation, creating two floating-point multiply-add results in register pair (f4, f5) indicated by a first register f4 of the pair, and reading as operands register pairs (f8, f9) and (f12, f13) and (f16, f17) indicated by the first registers f8, f12, f16 of the register pairs, respectively.

In accordance with another embodiment, structurally similar instructions are merged to generate a single wide data operation. In one exemplary embodiment, two 64 bit architectural add operations used to compute a 128 bit sum are merged into a single 128 bit operation:

Example 2

Code Sequence Using Architected Instructions
Addc r8=r10, r12
Adde r9=r11, r13
Internal Instruction Replacing Architected Sequence
Add128 r8=r10, r12

In this example, the Add128 is a single internal operation, creating a 128 bit result stored in register pair (r8, r9) indicated by a first register r8 of the pair, and reading as operands register pairs (r10, r11) and (r12, r13) indicated by the first registers r10, r12 of the register pairs, respectively.

In accordance with one embodiment, instructions to be merged should meet additional constraints. For example, all register specifiers of one instruction should refer to an even register number, and register specifiers of a second instruction should refer to an odd register number. In another embodiment, register accesses for paired instructions are performed by implementing an odd and an even register bank, whereby the odd and even datapath elements (e.g., those logic circuits of a data path operating on data stored in even and odd registers, respectively) are operatively coupled to the even and odd register banks, and a reduced number of register file ports are provided.

These odd and even registers referred to by a first and second instruction should be adjacent. Odd and even registers may be stored jointly in a single wide register entry of a wide register file.

In a preferred embodiment, the registers are contiguous, but the registers need not be contiguous. In one hardware-optimized embodiment, the register names specified by a first scalar operation are all even register names, and the register names specified by the second scalar operation are all odd register names. In an alternative, the register names specified by a first scalar operation are all odd register names, and the register names specified by the second scalar operation are all even register names. A complexity-optimized implementation includes the merged instructions adjacent in the instruction stream; however, in a performance-optimized implementation, instructions to be merged can be in any non-adjacent location in the instruction stream and are dynamically merged. In a more restricted complexity-optimized implementation, a first instruction is in a first fixed position (e.g., at an "even instruction address", e.g., an instruction ending in 0x0 or 0x8 in a fixed width instruction set of instruction words having instructions of 4 byte width) and a second instruction are in a second fixed position (e.g., at an "odd instruction address", i.e., an instruction ending in 0x4 or 0xC in a fixed width instruction set of instruction words having instructions of 4 byte width). Those skilled in the art will understand the concept of positional restriction to either byte, word, instruction, bundle, or other locations and/or addresses, to simplify the detection and processing of instruction merging based on the foregoing exposition.

In accordance with one embodiment, the operations to be merged need to be exactly the same, although variants of the same dataflow can be merged, e.g., such as, but not limited to, a multiply-add and multiply subtract into a data parallel multiply-add/subtract operation (PFMAS). Vector/scalar operations can also be merged, wherein one or more operands are the same between two operands.

Example, 3

Thus, in one exemplary execution sequence, the Power Architecture™ instructions,
FMA f4=f8, f12, f22
FMA f5=f9, f13, f22
are converted by data-parallel instruction creation logic to one internal SIMD opcode with scalar operand,
PSFMA f4=f8, f12, <scalar>f16
The PSFMA is a single internal operation, creating a result in register pair (f4, f5) indicated by the first register f4 of the pair, and reading as operands register pairs (f8, f9) and (f12, f13) and scalar register f16 indicated by the first registers f8 and f12, of the register pairs, and <scalar>f16, respectively.

Load instructions may be executed as scalar load instructions. Load pair instructions may be present in the instruction set in an architecture, such as the Power Architecture™. Paired load instructions may be generated by recognizing one or more special idioms.

In one embodiment, only instructions having a single base register (rbase) and an instruction encoded immediate displacement field (displacement) can be merged. The displacement fields are preferably strictly offset by the data size in accordance with the following example:

Example 4

Code Sequence Using Architected Instructions
LF FR, rbase, displacement
LF FR+1, rbase, displacement+datasize
Internal Instruction Replacing Architected Sequence
PLF FR, rbase, displacement
In accordance with the Example 4, control logic will ensure the specification of displacements appropriately offset with reference to one another. PLF is a paired load floating point (LF) instruction. Those skilled in the art will understand that ensuring the ability to perform a correct merge will involve computing a result of a displacement field value of a first instruction with a data size of a first instruction, and compare the result to the displacement field of the second instruction.

In accordance with another embodiment, the architecture may be augmented with an instruction to include implicit addition of the offset of an appropriate size in a sequential interpretation, allowing the second instruction to encode an unmodified data field, and simplifying the comparison step.

Example 5

Code Sequence Using Architected Instructions
LF FR, rbase, displacement
LFS FR+1, rbase, displacement
Internal Instruction Replacing Architected Sequence
PLF FR, rbase, displacement
In Example 5, the instruction LFS FR+1, rbase, displacement, refers to the loading of a register numbered FR+1 from address specified by rbase+(displacement+datasize) in a sequential (non-merged) implementation of the instruction set.

Example 6

Code Sequence Using Architected Instructions
LFU FR, rbase, displacement
LFU FR+1, rbase, displacement
Internal Instruction Replacing Architected Sequence
PLFU FR, rbase, displacement
In Example 6, the PLFU instruction is a single internal operation, loading two floating point registers (FR, FR+1), with values adjacent in memory specified by address and specified by the updating addressing mode in accordance with an exemplary architecture (such as including but not limited to the Power Architecture™), and updating the address base rbase by 2*datasize in accordance with the paired load semantics. Those skilled in the art will understand that logic can be created to understand other idioms, such as including but not limited to:
LF FR, rbase, rindex
ADDI rindex=rindex, datasize
LF FR+1, rbase, rindex
Those skilled in the art will also understand that similar transformations can be applied to other memory instructions such as including but not limited to store instructions. The repertoire of detected sequences is preferably small to simplify the detection logic, and that the purpose of detecting such sequences is preferably not the improvement of arbitrary sequences, but rather the provision of a small backward compatible repertoire to encode "wide instructions" using a narrow-operation Instruction Set Architecture (ISA) when targeting a microprocessor supporting wide operations using wide internal instructions.

In accordance with principles of the present invention, a same sequence of scalar instructions can be executed on any ISA compliant processor as a sequence of a first FMA and a second FMA either in parallel on two independent, non-data parallel function units, or sequentially, on the same or different functional execution units.

In one embodiment, paired instructions are created during a cache reload, of a first, second, third, . . . level cache. In another embodiment, paired instructions are created during an instruction fetch. In another embodiment, paired load instructions are created during group formation. In another embodiment, group formation is performed during a cache reload of a first, second, third, . . . level cache. In yet another embodiment, group formation is performed after the instruction fetch.

In accordance with one embodiment, instruction pairing is performed after register renaming. Instruction pairs are dispatched, issued and executed as data parallel operations. In one embodiment, instructions are committed as separate scalar results. In another embodiment, they are committed as a pair.

Figure 2:
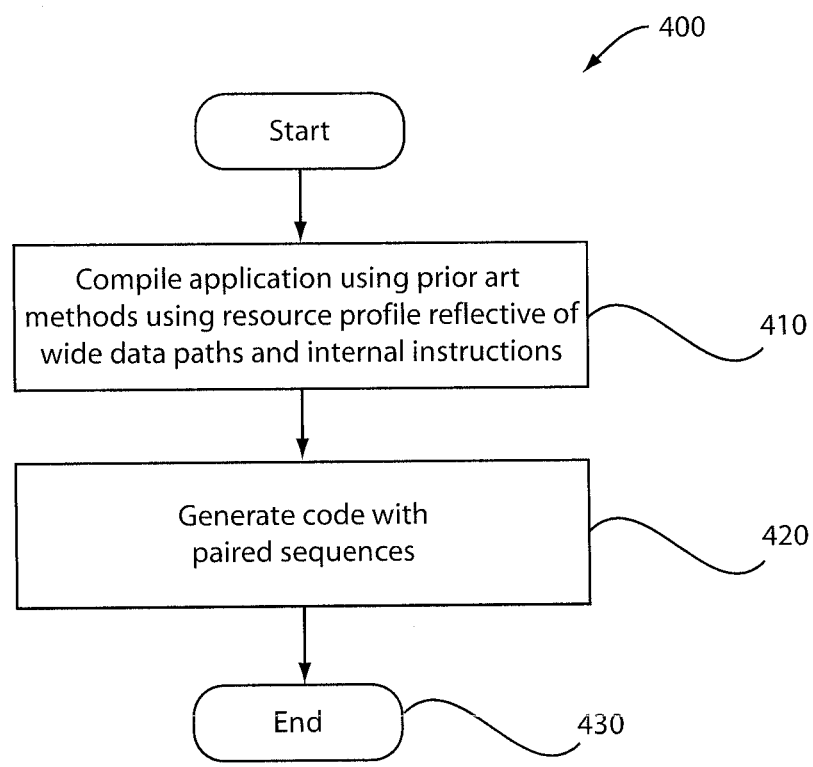
FIG. 2 is a block/flow diagram showing a preferred method for code generation used by a compiler (or programmer) generating code for a processor process from merging instructions in accordance with one illustrative embodiment.

Referring to FIG. 2, a compilation and encoding method is shown for an illustrative compiler which may be employed in embodiments of the present invention. The method 400 starts with step 410. In step 410, a compiler (or assembly programmer) compiles an application by advantageously using a resource profile reflective of wide datapaths. The application may be compiled using known methods, but modified in accordance with aspects of the present invention. The method in step 410, preferably uses an internal compiler representation reflective of the internal instructions used by a microprocessor employing a compatible narrow data width ISA.

In step 420, the internal instruction representation (having advantageously been optimized using a representation of the resource profile of the target machine) is converted to an architectural representation of an ISA supporting narrow data width. The internal representation operations representative of wide data processing are converted to sequences understood by the targeted microprocessor implementing wide datapaths. This conversion is performed while compatibly supporting programs using a narrow width data ISA to represent wide internal instructions operating on wide data. The method terminates at step 430.

In accordance with this method, those skilled in the art will also understand that the repertoire of detected sequences is preferably small to simplify the detection logic, and that the purpose of detecting such sequences is preferably not the improvement of arbitrary sequences, but rather the provision of a small backward compatible repertoire to encode "wide instructions" using a narrow-operation ISA when targeting a microprocessor supporting wide operations using wide internal instructions.

Figure 3:
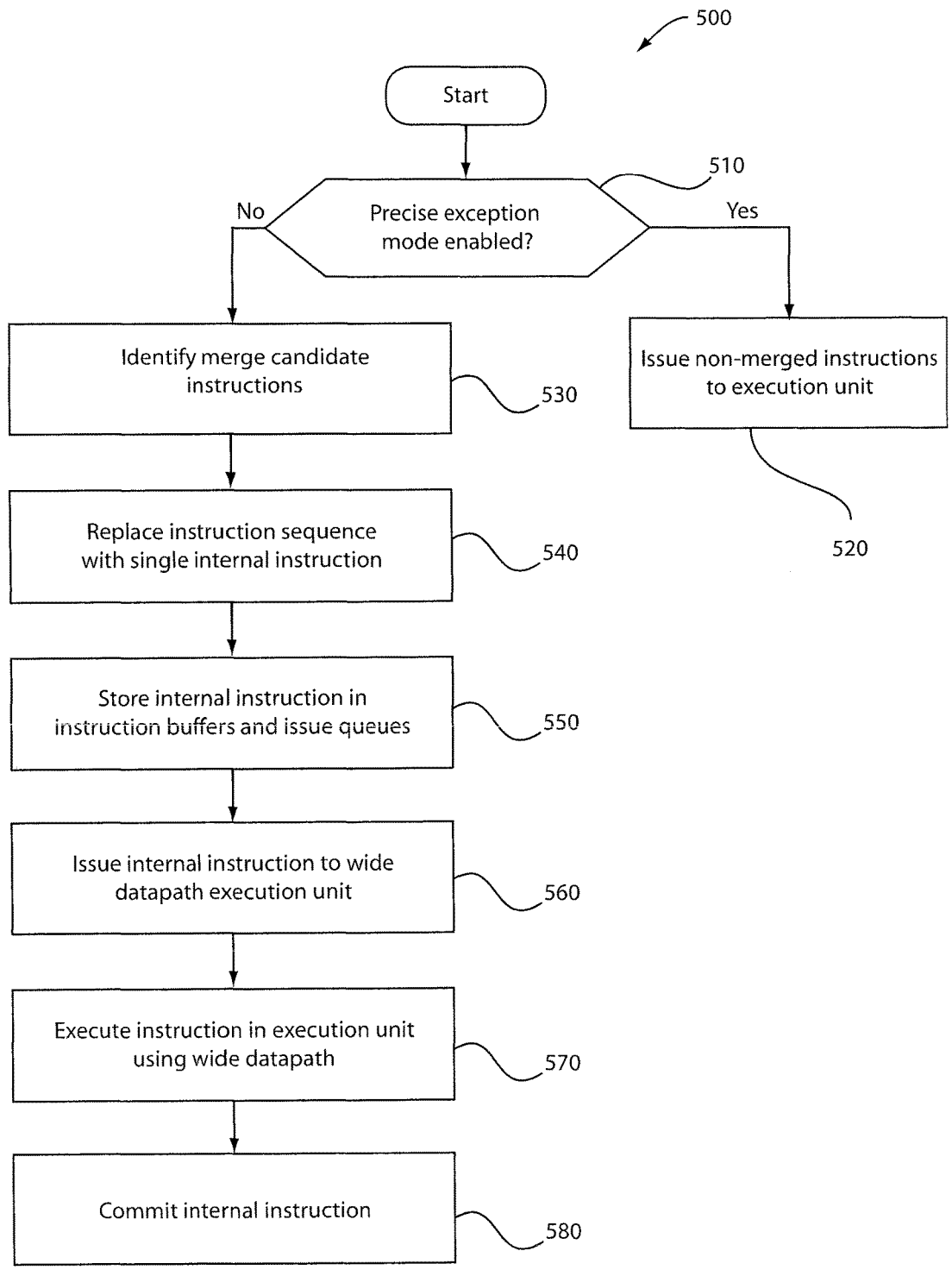
FIG. 3 is a block/flow diagram showing an embodiment for conditionally merging instructions depending on a first processor mode implementing precise exceptions and a second processor mode implementing imprecise exceptions in accordance with an illustrative embodiment.

Referring to FIG. 3, a flow diagram of a method to support reporting of architecturally needed precise exceptions when the precise exceptions need to be associated with instructions that could otherwise be merged. In accordance with one architecture (such as including but not limited to the Power Architecture™), there is provided a first mode 502 needing precise exceptions, and a second mode 504 not needing precise exceptions. In other architectures, a variety of exceptions (such as including but not limited to floating point imprecise, underflow, and so forth, exceptions specified by the IEEE 754 floating point standard) can be disabled. Instructions may be merged when the processor is in "imprecise exception mode". However, the instructions may also be merged when the processor is in precise exception mode. In the latter case (precise exception mode), an exception in the grouped instruction is resolved by either allowing a first portion of the paired instruction to commit and reporting the address of the second instruction of the pair, or by rejecting the instruction execution and re-executing the scalar operations singly (e.g., as independent scalar operations).

The method 500 of FIG. 3, starts with step 510. In step 510, a test is performed whether precise exception mode is enabled. If exceptions for a class of instructions are enabled, merge logic for this class of instructions passes control to step 520. If imprecise exceptions are configured, or exceptions are disabled, for a class of instructions, merge logic for this class of instructions passes control to step 530. In step 520, instructions are not merged, and architected instructions are processed unmerged in accordance with the architectural definition.

In step 530, instructions are identified as candidates for being merged into an internal instruction operating on wide data to be executed on a wide datapath. In step 540, a sequence of instructions which has been identified as candidates for merging, and which satisfy conditions for merging, are replaced with a single internal instruction operating on wide data to be executed on a wide datapath. In step 550, at least one internal instruction created by step 540 is stored in at least one of a buffer, an issue queue, and a global completion table. In step 560, at least one internal instruction having been created by step 540 to replace a sequence of architectural instructions is issued to an execution unit implementing a wide datapath. In step 570, the at least one internal instruction is executed in the execution unit using the wide data path. In step 580, the result generated by the execution of the at least one internal instruction is committed to the processor state.

Those skilled in the art will understand that the determination in accordance with the present method can be made independently for different classes of instructions when multiple classes of exceptions can be independently enabled and disabled, and different architectural instruction classes correspond to these different exception conditions. Those skilled in the art will also understand that a first set of instructions may correspond to a first set or class of exceptions, a second class of instructions to second class of exceptions, a third class of instructions may correspond to both the first and second class of exceptions, a fourth class of instructions may never correspond to an exception condition, and so forth.

Figure 4:
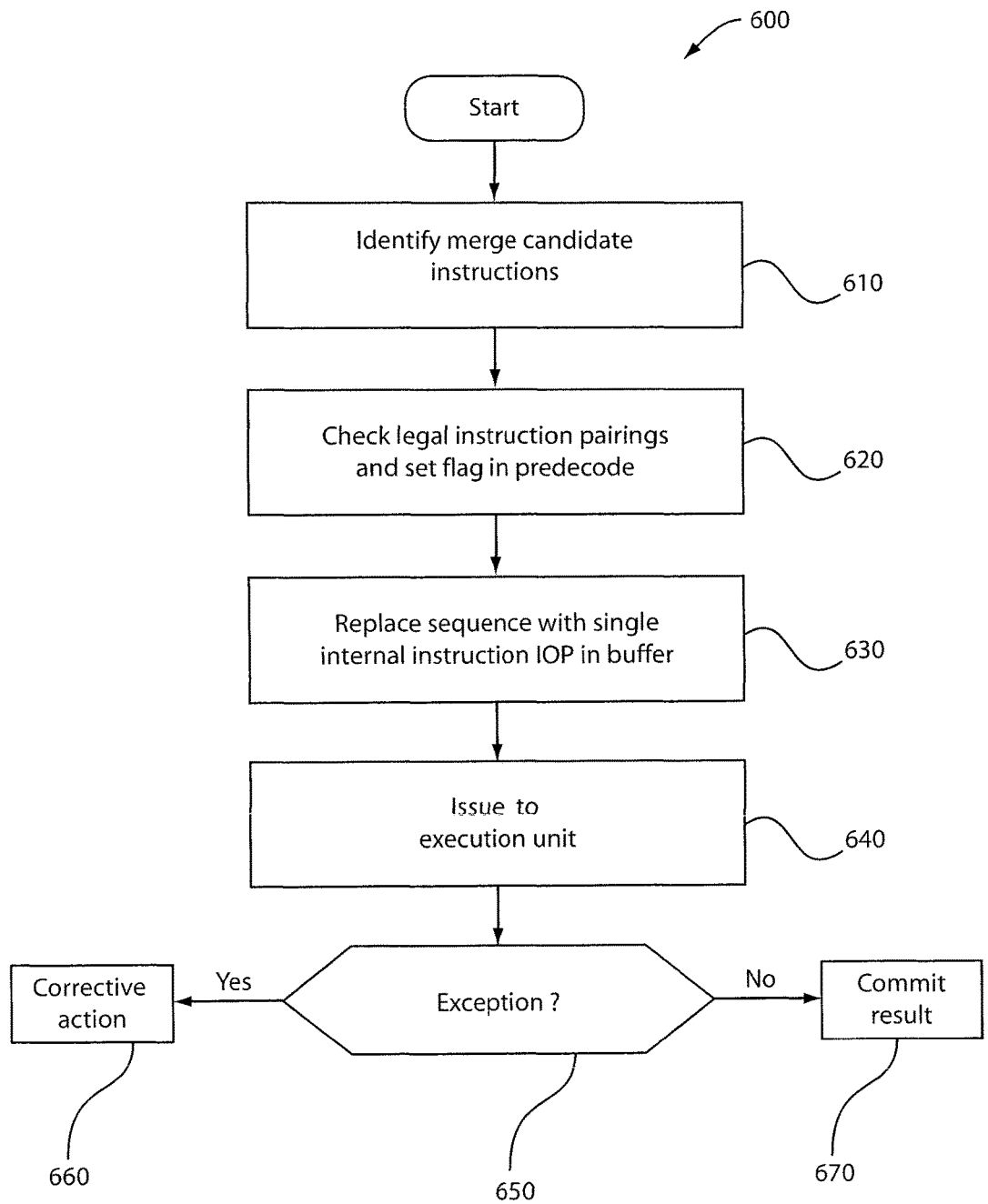
FIG. 4 is a block/flow diagram exception handling for an out-of-order processor implementing an illustrative embodiment of the present invention.

Referring to FIG. 4, there is shown an alternate embodiment to the embodiment shown in FIG. 1. In accordance with the embodiment shown in FIG. 4, the use of predecode logic is provided to detect merge sequences in a first predecode step. There is also provided a method for merging instructions when the instructions can raise an exception and precise exceptions are architecturally needed and/or selected by an application in accordance with an architecture specification. Method 600 starts with step 610.

In step 610, merge candidate instructions are identified. In step 620, checks are performed to ensure that the merge candidates meet all the requirements (e.g., some requirements may include similar instructions, even and odd register names, alignment on specific instruction addresses, etc.) to successfully pair the instructions, and if so, then at least one predecode bit is generated. In at least one embodiment, this predecode bit is stored in a cache. In step 630, a sequence of instructions is replaced by at least one internal instruction corresponding to the sequence. The internal instruction is representative of an instruction operating on wide data when the architectural instruction set specifies a sequence of narrow data operations. The wide data operation represents the combined architectural semantics of the sequence of narrow data operations, and the at least one internal instruction (Internal Operation or IOP) is stored in an instruction buffer (ibuffer) or other similar structure storing instructions until execution.

In step 640, a wide internal instruction is issued to an execution unit implementing a wide datapath. In step 650, a test is performed whether at least one architectural instructions having been merged is specified to cause a precise exception in accordance with the architectural specification. If an exception (or the possibility of an exception) is indicated, control transfers to step 660. If no exception is indicated, control transfers to step 670. In step 660, corrective action is taken and the method terminates. This may include a corrective action indicator which alerts logic in the processing system (e.g., predecoder 750 (FIG. 5) or 850 (FIG. 6) and/or decoder 860 (FIG. 6) of the corrective action or termination. In step 670, the results are committed and the method terminates.

For step 650, those skilled in the art will understand that the test for exceptions can be accurately reflective of the occurrence of an exception condition, or may indicate the possibility of an exception. Some exception conditions are excessively expensive to compute on a routine basis, but a simple conservative condition (e.g., one which will never skip an exception when such exception is possible, but may indicate the possibility of an exception when none has occurred in accordance with the architectural specification) is simple to compute. An example may be the presence of certain imprecise results, or generation of denormal (or denormalized, in accordance with IEEE floating point standard and other similar floating point formats) results, and so forth. In other instances, a condition may be not be repeatable, and exception processing is always entered (e.g., when a memory operation refers to non-cacheable or I/O space, paired load instructions may need to enter recovery mode).

In accordance with one recovery action, a pipeline is stalled, and a precise exception determination and instruction completion is performed. In accordance with another embodiment, the internal instruction is flushed, and an indication is passed to merge logic preventing the merging of the referenced instruction sequence to a single instruction for one or more executions. The instruction sequence is then executed in accordance with the architectural specification, allowing exceptions to be handled in accordance with the exception specifications of the narrow data width architecture specification.

Figure 5:
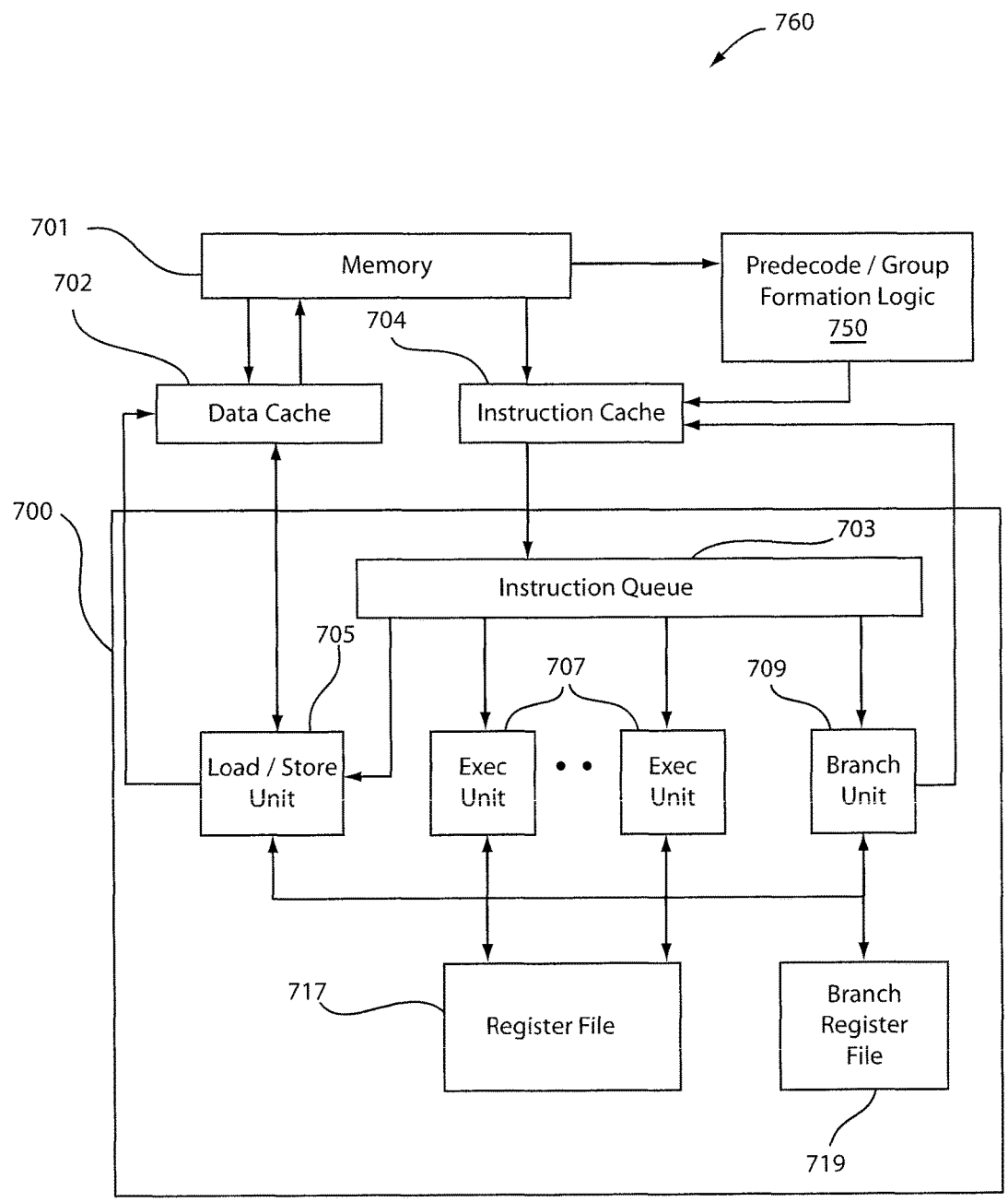
FIG. 5 is a schematic diagram showing an in-order microprocessor implementing logic in accordance with an illustrative embodiment.

Referring to FIG. 5, a processor unit 700 in a processing system 760 is illustratively shown provided with the ability to merge a sequence of instructions operating on narrow data widths into a single internal instruction operating on wide data. The system 760 includes a memory subsystem 701, a data cache 702, an instruction cache 704, and the processor unit 700. The instruction cache 704 stores instruction groups generated during cache reload by instruction predecode and group formation logic 750. The processor unit 700 includes an instruction queue 703, one or more load/store units 705 (one shown), several execution units 707 that perform integer and logic operations, a branch unit 709, and register files 717 and 719.

Instruction groups are fetched from the instruction cache 704 (or the memory subsystem 701 and processed by instruction predecode and group formation logic 750 if not in the instruction cache) under control of the branch unit 709 and are placed in the instruction queue 703. Instructions are decoded and dispatched from the instruction queue 703 to the load unit(s) 705, execution units 707, and branch unit 709 for execution. These units interact with the register files 717 and 719 to access the operands used by the instructions and save the results produced by the execution of the instructions. The register files 717 and/or 719 may include general-purpose registers (GPRs), and branch-related registers such as link registers (LRs), count registers (CTRs) and condition registers (CRs).

The load/store unit(s) 705 also interacts with the data cache 702 and the memory subsystem 701, to load data used by the instructions that are executed by the execution units 707 and/or branch unit 709, and to store results generated by the execution units.

In accordance with one preferred embodiment of the present invention, the system 760 includes predecode and group formation logic 750 that implements method 500 of FIG. 3.

In accordance with one embodiment of microprocessor 700, the cache is invalidated when precise exception modes are enabled and disabled. In accordance with another embodiment, a line is associated with a first and second exception mode, and a cache miss is triggered to regenerate the group under control of the new exception mode.

An implementation of a processor capable of dynamically scheduling instructions (an out-of-order issue processor) includes the following features:

1. A mechanism for issuing instructions out-of-order, including the ability to detect dependencies among the instructions, rename the registers used by an instruction, and detect the availability of the resources used by an instruction.

2. A mechanism for maintaining the out-of-order state of the processor, which reflects the effects of instructions as they are executed (out-of-order).

3. A mechanism for retiring instructions in program order, simultaneously updating the in-order state with the effects of the instruction being retired.

4. A mechanism for retiring an instruction in program order without updating the in-order state (effectively canceling the effects of the instruction being retired), and for resuming in-order execution of the program starting at the instruction being retired (which implies canceling all the effects present in the out-of-order state).

Mechanism 3 from the list above is used to retire instructions when the effects of the instruction being retired are correct. Mechanism 4 is used instead, whenever there is some abnormal condition resulting from the execution of the instruction being retired or from some external event.

Figure 6:
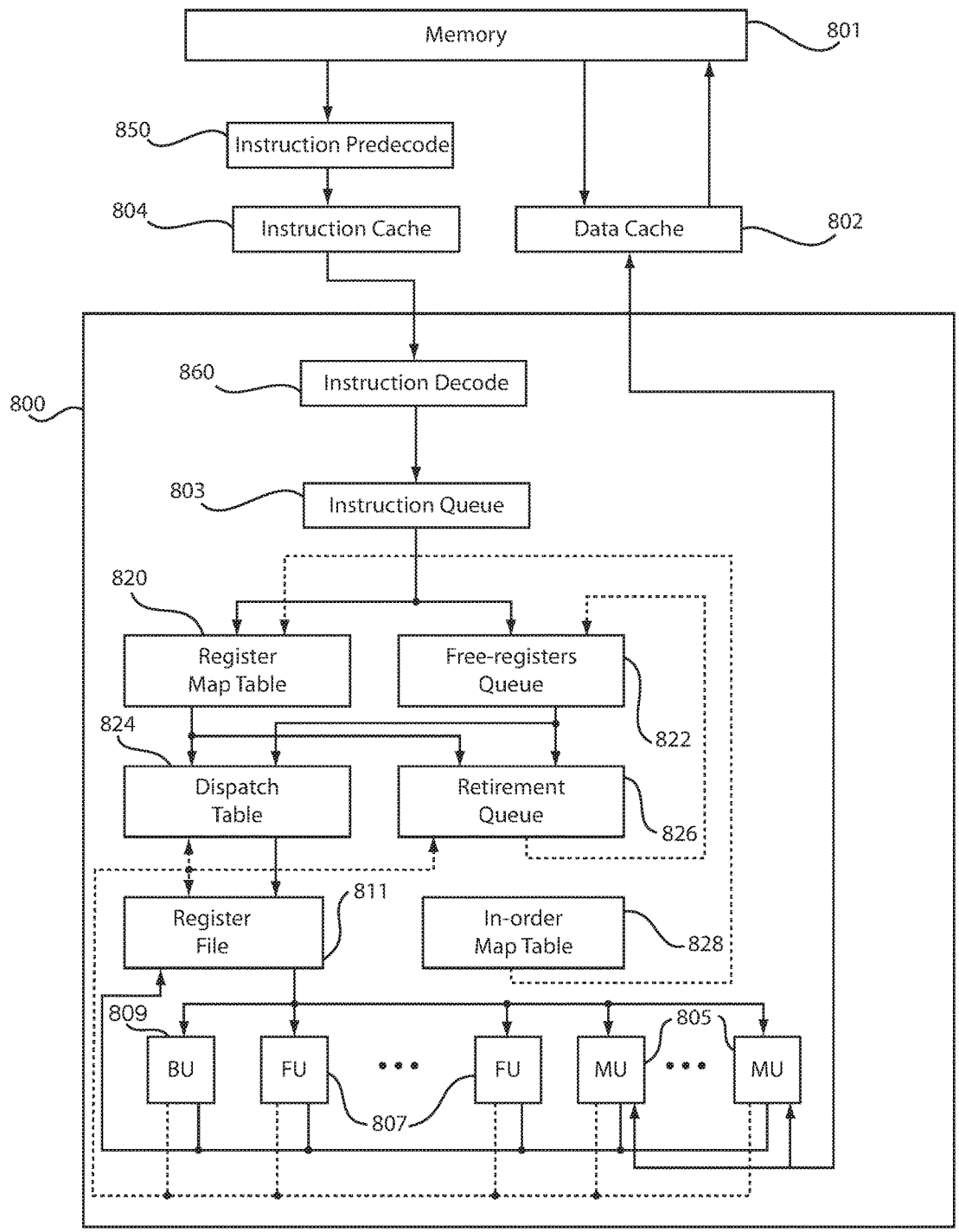
FIG. 6 is a schematic diagram showing a microprocessor implementing out of order instruction processing implementing logic in accordance with another illustrative embodiment.

Referring to FIG. 6, a processing system is illustratively shown which provides the functionality as set forth in accordance with the present principles. The processing system includes instruction decode logic 850 and group formation logic 860 that generates instruction groups having a single internal instruction operating on wide data corresponding to a sequence of architectural instructions operating on narrow data.

A superscalar processor 800 provided with hardware resources to support reordering of instructions using the mechanisms listed above, is illustratively shown in FIG. 6. The processing system includes a memory subsystem 801, a data cache 802, an instruction cache 804, and a processor unit 800. The processor unit 800 includes an instruction queue 803, several memory units (MU) 805 that perform load and store operations, several functional units (FU) 807 that perform integer, logic and floating-point operations, a branch unit (BU) 809, one or more register files 811, at least one register map table 820, a free-registers queue 822, a dispatch table 824, a retirement queue 826, and an in-order map table 828.

This exemplary organization of FIG. 6 includes the ability to merge instructions referring to a plurality of narrow data width operations into single internal instruction operating in wide data executing on a wide datapath. Basic operation of aspects of this type of processor is based on the one described by M. Moudgill, K. Pingali, S. Vassiliadis in "Register renaming and dynamic speculation: an alternative approach," in Proceedings of the 26th Annual International Symposium on Microarchitecture, pp. 202-213, September 1993.

In the processor 800, instructions are fetched from the instruction cache 804 (or the memory subsystem 801 and predecoded by instruction predecode logic 850 if not in the instruction cache) under control of the branch unit 809. The instructions are decoded by instruction decode logic 860 and placed in the instruction queue 803. Instructions are extracted from the instruction queue 803 and decoded to extract operation code, register specifiers, immediate fields, and so forth.

The architected registers' names used by the instructions for specifying the operands are renamed according to the contents of the register map table 820, which specifies the current mapping from architected register names to physical registers. The architected registers' names used by the instructions for specifying the destinations for the results are assigned physical registers extracted from the free-register queue 822. The free-register queue 822 includes the names of physical registers not currently being used by the processor 800. The register map table 820 is updated with the assignments of physical registers to the architected destination register names specified by the instructions.

Instructions with all their registers renamed are placed in the dispatch table 824. Instructions are also placed in the retirement queue 826, in program order, including their addresses, their physical and their architected register names. Instructions are dispatched from the dispatch table 824 when all the resources used by the instructions are available (physical registers have been assigned the expected operands, and functional units are free). The operands used by the instruction are read from the respective register files 811, which may include general-purpose registers, branch-related registers such as link registers (LRs), count registers (CTRs) and condition registers (CRs), floating point registers (FPRs), SIMD vector registers (VRs), etc. Instructions are executed, potentially out-of-order, in a corresponding memory unit 805, functional unit 807, or branch unit 809. Upon completion of execution, the results from the instructions are placed in the register file 811. Instructions in the dispatch table 824 waiting for the physical registers set by the instructions completing execution are notified. The retirement queue 826 is notified of the instructions completing execution, including whether they raised any exceptions.

Completed instructions are removed from the retirement queue 826, in program order (from the head of the queue). At retirement time, if no exceptions were raised by an instruction, the in-order map table 828 is updated so that architected register names point to the physical registers in the register file 811 including the results from the instruction being retired. The previous register names from the in-order map table 828 are returned to the free-registers queue 822. On the other hand, if an instruction has raised an exception, program control is set to the address of the instruction being retired from the retirement queue 826. The retirement queue 826 is cleared (flushed), thus canceling all unretired instructions. The register map table 820 is then set to the contents of the in-order map table 828, and any register not in the in-order map table 828 is added to the free-registers queue 822.

In addition to the components above, superscalar processors may include other components such as branch-history tables to predict the outcome of branches.

The superscalar processor 800 supports the combining of a sequence of architected instructions operating on narrow data into a single internal instruction operating on wide data as set forth with reference to FIG. 4 and provides the following.

A. A mechanism for identifying if sequences of architectural instructions referring to a plurality of narrow data operations can be merged into a single internal instruction operating on wide data corresponding to said plurality of narrow data, and if all constrains to successfully merge said sequence are met.

B. A mechanism for combining the sequence;

C. A mechanism to conditionally suppress the combining step in response to a corrective action indicator;

D. A mechanism for mapping references to wide registers from logical to physical registers;

E. A mechanism for initiating corrective action when an internal instruction indicates the possibility of an exception corresponding to an architected instruction;

The mechanisms provided by the present embodiments are used in conjunction with the mechanisms available in out-of-order processors, as follows. The mechanism A for identifying if sequences of architectural instructions referring to a plurality of narrow data operations can be merged into a single internal instruction operating on wide data corresponding to the plurality of narrow data, may be performed by predecode logic 850 if all constraints to successfully merge the sequence are met. The mechanism B for combining the sequence, and mechanism C to conditionally suppress the combining step (See FIG. 4) in response to a corrective action indicator are implemented in instruction decode logic 860. Mechanism D for mapping references to wide registers from logical to physical registers is preferably implemented in register map table 820. Mechanism E for initiating corrective action when an internal instruction indicates the possibility of an exception corresponding to an architected instruction is implemented as part of retirement queue 826.

In a preferred embodiment, mechanism E performs a flush of the processor pipeline and performs an indicating step to cause mechanism C to suppress the merging of instructions when a precise exception condition is to be derived. In accordance with one embodiment, all memory instructions referring to uncacheable, or guarded storage, or I/O space are flushed and reexecuted using the precise exception mode.

Those skilled in the art will understand a variety of mapper implementations are possible to implement mechanism D, including a multiported mapper wherein each wide reference will be mapped as a sequence of narrow references, a banked mapper, wherein a set of first even logical registers are mapped to a first set of physical registers, and a second set of odd logical registers are mapped to a second set of physical registers; and a mapper supporting the mapping of wide registers using a single mapping step.

Having described preferred embodiments of method and apparatus for the dynamic creation of instructions utilizing a wide datapath (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A processing system, comprising:
  a predecoder configured to identify instructions that are combinable to form a single, executable internal instruction;
  an instruction storage; and
  a processor configured to merge instructions that are combinable, the processor comprising:
  an instruction execution unit configured to execute the single, executable internal instruction on a hardware wide datapath;
  wherein the identified instructions are configured to execute on a legacy system using a smaller architectural width than the processing system.

2. The processing system as recited in claim 1, wherein the processor includes an instruction decoder.

3. The processing system as recited in claim 2, wherein the decoder includes a corrective action indicator to suppress merging instructions that fail a test.

4. The processing system as recited in claim 1, further comprising a register map table configured to map references to wide registers from logical to physical registers to enable execution of the single, executable internal instruction.

5. The processing system as recited in claim 1, further comprising a retirement queue configured to initiate corrective action when the instruction execution unit indicates a possibility of an exception corresponding to the single, executable internal instruction.

6. The processing system as recited in claim 1, wherein the predecoder is configured to determine whether a plurality of architectural instructions operating on architectural width data are candidates for merging into a wide data internal instruction.

7. The processing system as recited in claim 1, wherein the processor has at least one datapath to operate on wide internal instructions.

8. The processing system as recited in claim 1, wherein the processor merges a sequence of at least two similar operations to be performed as one data parallel operation.

9. The processing system as recited in claim 8, wherein the at least two similar operations include a pair of two like instructions referring to adjacent registers.

10. A processing system for merging instructions for execution on a hardware wide datapath, the processing system comprising:
a predecoder configured to identify candidate architected instructions for merging from memory storage; and
a processor including:
an instruction decoder configured to replace a set of acceptable architected candidate instructions with a single, executable internal instruction; and
at least one execution unit configured to execute the single, executable internal instruction on the hardware wide datapath;
wherein the identified instructions are configured to execute on a legacy system using a smaller architectural width than the processing system.

11. The processing system as recited in claim 10, further comprising a register map table configured to map references to wide registers from logical to physical registers to enable execution of the single, executable internal instruction.

12. The processing system as recited in claim 10, further comprising a retirement queue configured to initiate corrective action when a possibility of an exception corresponding to the single, executable internal instruction is present.

13. The processing system as recited in claim 10, wherein the predecoder is configured to determine whether a plurality of architectural instructions operating on architectural width data are candidates for merging into a wide data internal instruction.

14. A method for merging instructions for execution on a wide datapath, the method comprising:
identifying candidate architected instructions for merging;
replacing a set of acceptable architected candidate instructions with a single, executable wide datapath internal instruction; and
issuing the single, executable wide datapath internal instruction to a hardware wide datapath execution unit for execution;
wherein the identified candidate architected instructions are configured to execute on a legacy system using a smaller architectural width than a processing system executing the method.

15. The method as recited in claim 14, further comprising executing the single, executable wide datapath internal instruction on the wide datapath.

16. The method as recited in claim 14, wherein the replacing includes merging a sequence of at least two similar operations to be performed as one data parallel operation.

17. The method as recited in claim 16, wherein the at least two similar operations include a pair of two like instructions referring to adjacent registers.

18. The method as recited in claim 14, wherein the identifying includes determining whether a plurality of architectural instructions operating on architectural width data are candidates for merging into the single, executable wide datapath internal instruction.

19. The method as recited in claim 14, further comprising enabling merging of the acceptable architected instructions absent an exception.

* * * * *